(12) United States Patent
Ajisaka

(10) Patent No.: US 7,712,785 B2
(45) Date of Patent: May 11, 2010

(54) WEBBING GUIDE MECHANISM

(75) Inventor: Satoshi Ajisaka, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 378 days.

(21) Appl. No.: 11/792,525

(22) PCT Filed: Dec. 2, 2005

(86) PCT No.: PCT/JP2005/022604

§ 371 (c)(1),
(2), (4) Date: Jun. 7, 2007

(87) PCT Pub. No.: WO2006/064720

PCT Pub. Date: Jun. 22, 2006

(65) Prior Publication Data

US 2008/0093832 A1   Apr. 24, 2008

(30) Foreign Application Priority Data

Dec. 14, 2004 (JP) ............................. 2004-361721

(51) Int. Cl.
B60R 22/00 (2006.01)

(52) U.S. Cl. .................. 280/808; 280/801.1; 297/473; 297/483; 297/331; 297/335

(58) Field of Classification Search ............. 280/801.1, 280/808; 297/473, 483, 481, 331, 335, 336, 297/341, 332, 333, 378.12

See application file for complete search history.

(56) References Cited

U.S. PATENT DOCUMENTS

| 4,323,278 A | * | 4/1982 | Sukopp et al. | ............. 297/481 |
|---|---|---|---|---|
| 4,400,013 A | * | 8/1983 | Imai | ......................... 280/801.1 |
| 4,541,654 A | * | 9/1985 | Jonasson | .................. 280/801.1 |
| 4,643,449 A | * | 2/1987 | Sasaki et al. | ................. 280/808 |
| 4,718,696 A | * | 1/1988 | Koide et al. | .............. 280/801.1 |
| 5,253,924 A | * | 10/1993 | Glance | .................. 297/452.1 |
| 5,263,741 A | * | 11/1993 | Seros et al. | .................. 280/808 |
| 5,340,198 A | * | 8/1994 | Murphy et al. | .............. 297/483 |
| 5,358,310 A | * | 10/1994 | Nemoto | ....................... 297/483 |
| 5,393,123 A | * | 2/1995 | Hernandez et al. | ...... 297/378.12 |
| 5,577,805 A | * | 11/1996 | Glinter et al. | .......... 297/378.12 |

(Continued)

FOREIGN PATENT DOCUMENTS

| DE | 198 24 404 A1 | 12/1999 |
| DE | 198 38 930 C1 | 12/1999 |
| EP | 1 193 142 A2 | 4/2002 |
| JP | U-55-34860 | 3/1980 |
| JP | A-59-34958 | 2/1984 |
| JP | U-59-130754 | 9/1984 |
| JP | Y2 7-22362 | 5/1995 |
| JP | A-2000-103271 | 4/2000 |

Primary Examiner—Faye M. Fleming
Assistant Examiner—Nicole Verley
(74) Attorney, Agent, or Firm—Oliff & Berridge, PLC

(57) ABSTRACT

A webbing guide mechanism includes an upper webbing guide (58) and a lower webbing guide (60) that are disposed on the side portion of a seat back (30) of a front seat (24) that is a tumbling seat. A webbing (50) is wound in a looped manner on these guides (58, 60). The webbing (50) is pulled forward and a loading/unloading space (78) is easily enlarged by sequentially changing the seat back (30) from a standard state to an inclined state and then to a tumbled state. According to the invention, a webbing guide mechanism is provided which can easily secure, without troubling a passenger, loading/unloading space behind the front seat (24) when the passenger climbs into or out of the space or when the passenger loads items into or unloads items from the space.

20 Claims, 12 Drawing Sheets

U.S. PATENT DOCUMENTS

| | | | |
|---|---|---|---|
| 5,599,070 A * | 2/1997 | Pham et al. | 297/483 |
| 5,733,013 A * | 3/1998 | Brown | 297/483 |
| 6,042,190 A * | 3/2000 | Mathe et al. | 297/483 |
| 6,382,491 B1 * | 5/2002 | Hauser et al. | 296/65.05 |
| 6,585,325 B1 * | 7/2003 | Pal | 297/483 |
| 6,637,826 B2 * | 10/2003 | Takayama | 297/484 |
| 6,655,745 B2 * | 12/2003 | Fohrenkamm et al. | 297/481 |
| 6,827,394 B2 * | 12/2004 | Watanabe et al. | 297/15 |
| 6,846,020 B2 * | 1/2005 | Xu | 280/808 |
| 6,871,876 B2 * | 3/2005 | Xu | 280/801.1 |
| 6,921,136 B2 * | 7/2005 | Bell et al. | 297/468 |
| 7,059,445 B2 * | 6/2006 | Higuchi et al. | 180/268 |
| 7,100,984 B2 * | 9/2006 | Epaud et al. | 297/341 |
| 7,246,836 B2 * | 7/2007 | Hahn | 296/65.02 |
| 2001/0020783 A1 * | 9/2001 | Townsend et al. | 280/801.1 |
| 2004/0061323 A1 | 4/2004 | Xu | |

\* cited by examiner

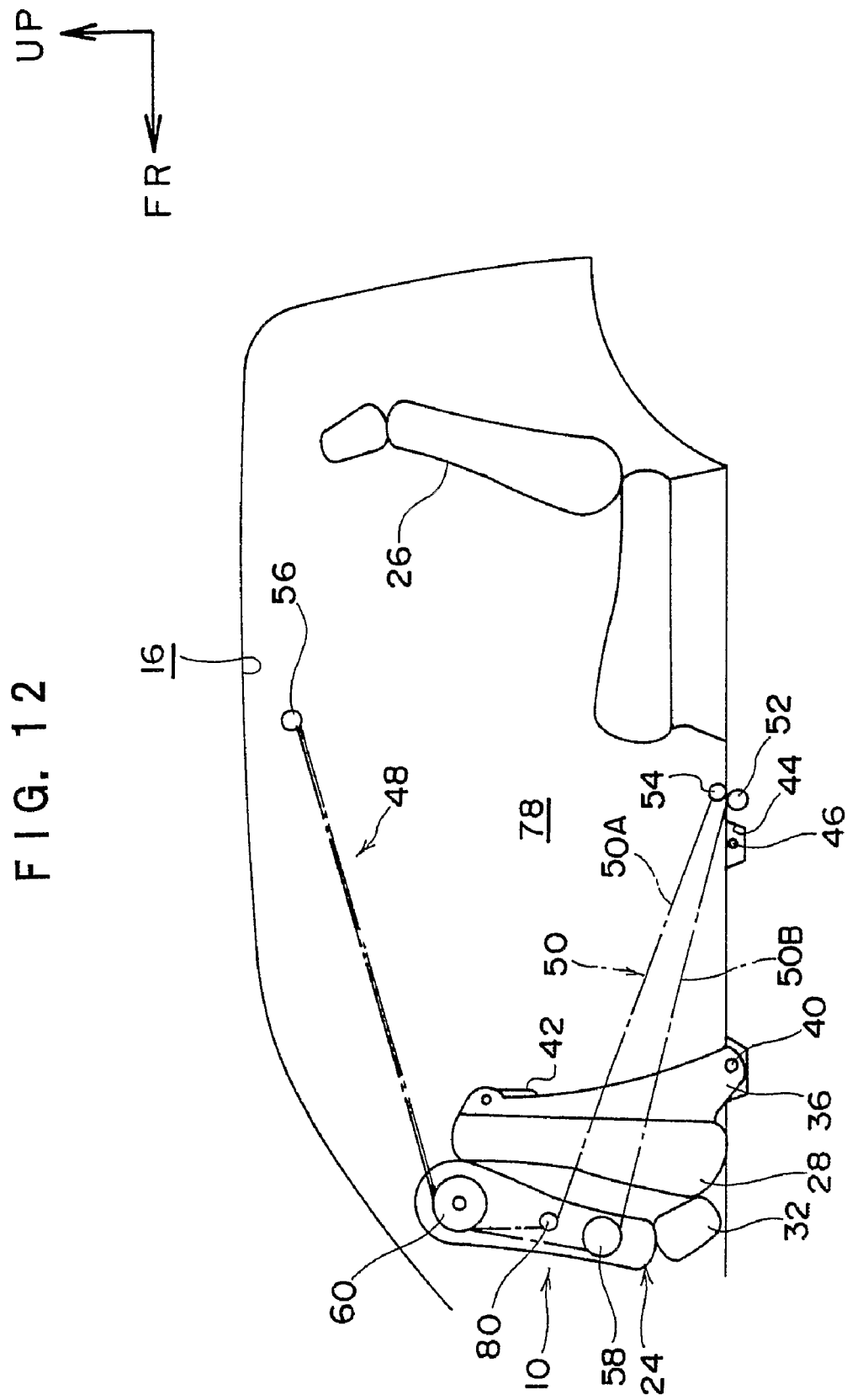

WEBBING GUIDE MECHANISM

TECHNICAL FIELD

The present invention relates to a webbing guide mechanism that is disposed on a seat rear portion of a vehicular seat and configured to include webbing guides that regulate the routing path of a webbing that is supported on a vehicle body and is for restraining a passenger.

PRIOR ART

Japanese Utility Model Publication No. 7-22362 discloses a seat belt guide device applied to a two-door automobile.

This seat belt guide device includes a columnar housing hole formed in an upper portion of the outer side of a seat back of a front seat, and a nut is fixedly disposed in the bottom portion of the housing hole. A threaded rod is screwed into the nut, and a roller-shaped belt guide is fixed in the end portion of the threaded rod. A threaded groove is formed in the outer peripheral surface of the belt guide, and a webbing is wound onto the belt guide such that teeth portions formed on the undersurface of the webbing mesh with the threaded groove.

According to this configuration, when the seat back of the front seat is inclined forward when the passenger climbs into or out of the rear seat, the belt guide rotates due to the belt guide meshing with the teeth portions of the webbing. Thus, the threaded rod that is screwed into the nut rotates around the axis thereof, and the belt guide moves in the axial direction and becomes housed in a housing. As a result, the webbing comes off of the belt guide, and the ease with which the passenger can climb into or out of the rear seat is improved.

However, according to this configuration, when the seat back of the front seat is returned after the passenger has climbed into or out of the rear seat, the webbing guide is returned to its original state, and it is necessary to again wind the webbing onto the webbing guide, which is troublesome.

DISCLOSURE OF THE INVENTION

In view of this circumstance, it is an object of the present invention to obtain a webbing guide mechanism that can easily secure loading/unloading space, without troubling the passenger, when the passenger climbs into or out of the space behind the seat or when the passenger loads items into or unloads items from the space behind the seat.

A first aspect of the invention provides a webbing guide mechanism that is disposed on a seat rear portion of a vehicular seat and configured to include webbing guides that regulate the routing path of a webbing that is supported on a vehicle body and is for restraining a passenger, wherein the webbing guides are disposed on the seat rear portion at plural places in the height direction and work together in accompaniment with the displacement of the seat rear portion to change the routing path of the webbing.

A second aspect of the invention provides a webbing guide mechanism that is disposed on a seat rear portion of a vehicular seat and configured to include webbing guides that regulate the routing path of a webbing that is supported on a vehicle body and is for restraining a passenger, wherein the webbing guides are disposed on the seat rear portion at plural places in the height direction, the webbing is routed in a looped manner from a vehicle body lower portion side to a vehicle body upper portion side, a front side and a rear side of the webbing routed in the looped manner are correspondingly disposed on a front side and a rear side of the webbing guide positioned at the upper side in the seat height direction, and both of the front side and the rear side of the webbing routed in the looped manner are disposed on the front side of the webbing guide positioned at the lower side in the seat height direction.

In a third aspect of the invention, the vehicular seat is configured to include a seat cushion in which the passenger sits and a seat back that is inclinably disposed on a rear end portion of the seat cushion and configures the seat rear portion, and the vehicular seat can assume at least three states comprising a standard state where the seat back is upright on the rear end portion of the seat cushion, an inclined state where the seat back is prostrate on the seat cushion, and a tumbled state where the inclined vehicular seat is integrally rotated forward and becomes inverted with a front end portion of the seat cushion serving as a support point.

In a fourth aspect of the invention, the webbing guides comprise an upper webbing guide disposed on an upper portion of the seat width direction outer side face of the seat rear portion and a lower webbing guide disposed on a lower portion of the seat width direction outer side face of the seat rear portion, and each of the upper webbing guide and the lower webbing guide is configured to include a webbing receiver formed in a substantially cylindrical shape whose axial direction is in the seat width direction and coming-off prevention means that is disposed on an outer end portion of the webbing receiver and prevents the webbing wound onto the webbing receiver from coming off of the webbing receiver.

In a fifth aspect of the invention, the webbing guides are disposed on the outer side portion, in the seat width direction, of the seat rear portion and at positions where they overlap, when seen in side view, with seat frame members disposed along the seat width direction.

In a sixth aspect of the invention, the coming-off prevention means is a flange portion that planarly spreads in a direction perpendicular to the axis of the webbing receiver.

In a seventh aspect of the invention, the lower webbing guide is disposed coaxially with the center axis of inclination of the seat back.

In an eighth aspect of the invention, one end portion of the webbing is locked in a webbing take-up device disposed on the vehicle body lower portion, the other end portion of the webbing is locked in a lower anchor member disposed on the vehicle body lower portion, and the intermediate portion of the webbing is supported such that it is insertable in an upper anchor member disposed on the vehicle body upper portion.

According to the first aspect of the invention, the webbing guide mechanism is configured to include webbing guides disposed on the seat rear portion of the vehicular seat, and the routing path of the webbing that is supported on the vehicle body and is for restraining a passenger is regulated by the webbing guides.

Here, in the first aspect of the invention, the webbing guides are disposed on the seat rear portion at plural places in the height direction, and when the seat rear portion of the vehicular seat is displaced, the webbing guides work together in accompaniment with the displacement of the seat rear portion so that the routing path of the webbing is changed. After the routing path of the webbing has been changed, this state is maintained unless the seat rear portion is further displaced. Thus, loading/unloading space behind the seat rear portion of the vehicular seat is easily secured when the passenger climbs into or out of the space or when the passenger loads items into or unloads items from the space. In this respect, the invention has an excellent effect.

Also, in the present aspect, the webbing guides work together so that the routing path of the webbing is changed. Thus, in contrast with the prior art, winding the webbing again onto the webbing guides is not needed when the vehicular seat is returned to its original state, and the routing path of the webbing is naturally returned to its original state by the displacement of the seat rear portion when the seat rear portion is returned. Accordingly, the passenger is not troubled at all in this regard.

According to the second aspect of the invention, similar to the first aspect, the webbing guide mechanism is configured to include webbing guides disposed on the seat rear portion of the vehicular seat, and the routing path of the webbing that is supported on the vehicle body and is for restraining a passenger is regulated by the webbing guides.

Here, in the present aspect, the webbing guides are disposed on the seat rear portion at plural positions in the height direction, and the webbing is routed in a looped manner from the vehicle body lower portion side to the vehicle body upper portion side. Additionally, the front side and the rear side of the webbing routed in the looped manner are correspondingly disposed on the front side and the rear side of the webbing guide positioned at the upper side of the seat rear portion in the seat height direction, and both of the front side and the rear side of the webbing routed in the looped manner are disposed on the front side of the webbing guide positioned at the lower side of the seat rear portion in the seat height direction.

For this reason, when the seat rear portion is inclined forward, for example, the front side of the webbing is pushed forward by the webbing guide positioned at the upper side in the seat height direction, and the intermediate portion of the webbing in the height direction is greatly displaced forward. Also, when the seat rear portion is able to incline such that it becomes flat on the seat cushion, the intermediate portion of the webbing in the height direction is even more greatly displaced forward.

When the vehicular seat is a tumbling seat, for example, both of the front side and the rear side of the intermediate portion of the webbing in the height direction are simultaneously greatly displaced forward by the webbing guide positioned at the lower side in the seat height direction.

By routing the webbing in a looped manner on the webbing guides, various webbing routing paths are obtained in accompaniment with the displacement of the seat rear portion, and those states can be maintained. Thus, loading/unloading space behind the seat rear portion of the vehicular seat is easily secured when the passenger climbs into or out of the space or when the passenger loads items into or unloads items from the space.

When the invention is applied to a center pillar-less vehicle where the center pillar attached to the body is done away with, an extremely large loading/unloading space is obtained, and a remarkable effect is obtained.

Also, in the present aspect, the webbing is routed in the looped manner on the webbing guides, and the routing path of the webbing is changed in conjunction with (together with) the movement of the webbing guide positioned at the upper side in the seat height direction and the webbing guide positioned at the lower side in the seat height direction. Thus, in contrast with the prior art, winding the webbing again onto the webbing guides is not needed when the vehicular seat is returned to its original state, and the routing path of the webbing is naturally returned to its original state by the displacement of the seat rear portion when the seat rear portion is returned. Accordingly, the passenger is not troubled at all in this regard.

According to the third aspect of the invention, the vehicular seat is configured to include the seat cushion in which the passenger sits and the seat back that is inclinably disposed on the rear end portion of the seat cushion and configures the seat rear portion. Moreover, the vehicular seat can assume at least three states comprising a standard state where the seat back is upright on the rear end portion of the seat cushion, an inclined state where the seat back is prostrate on the seat cushion, and a tumbled state where the inclined vehicular seat is integrally rotated forward and becomes inverted with a front end portion of the seat cushion serving as a support point.

For this reason, in the webbing guide positioned at the upper side of the seat back in the height direction, rotational displacement of about 90 degrees from the upper side of the vehicle to the lower side of the vehicle can be obtained, and in the webbing guide positioned at the lower side of the seat back in the height direction, rotational displacement of about 90 degrees from the lower side of the vehicle to the upper side of the vehicle can be obtained. In other words, according to the present aspect, the displacement amounts are large and substantially the same in both of the webbing guide positioned at the upper side of the seat back in the height direction and the webbing guide positioned at the lower side of the seat back in the height direction, although the displacement directions are different between these two webbing guides.

Thus, it becomes easy to select the routing path of the webbing such that the degree of freedom in selecting the routing path of the webbing becomes high and such that the loading/unloading space becomes large. As a result, an excellent effect is exhibited in that a larger loading/unloading space can be easily secured.

According to the fourth aspect of the invention, each of the upper webbing guide and the lower webbing guide is configured to include a webbing receiver formed in a substantially cylindrical shape whose axial direction is in the seat width direction. Thus, when the seat rear portion or the entire vehicular seat is displaced forward, the webbing can be reliably retained on the outer peripheral surfaces of the substantially cylindrical webbing receivers and the routing path can be changed.

In other words, the webbing can be reliably retained on the upper webbing guide and the lower webbing guide when the seat rear portion is displaced, and the routing path of the webbing can be changed. As a result, the invention has the excellent effect that reliability with respect to the operation of the webbing guide mechanism can be raised.

Also, the coming-off prevention means that prevent the webbing wound onto the webbing receivers from coming off of the webbing receivers are disposed on the outer end portions of the webbing receivers of the upper webbing guide and the lower webbing guide. Thus, the webbing does not come off of the webbing receivers even if the webbing shifts toward the axial-direction outer side of the webbing receivers while the seat rear portion is being displaced.

According to the fifth aspect of the invention, the webbing guides are disposed on the outer side portion of the seat rear portion in the seat width direction and at positions where they overlap, when seen in side view, with seat frame members disposed along the seat width direction. Thus, in the event of a side collision, the collision load inputted to the body from a side thereof can be transmitted and dispersed to the seat frame members via the webbing guides. As a result, an excellent effect is exhibited in that the ability to protect the passenger in the event of a side collision can be improved.

According to the sixth aspect of the invention, the coming-off prevention means disposed on the outer end portions of the webbing receivers are configured as flange portions that planarly spread in a direction perpendicular to the axis of the webbing receivers. Thus, in the event of a side collision, the vehicle body strikes a broad region on the planarly spreading flange portions and inputs the collision load thereto. In other words, the coming-off prevention means not only fulfill the role of preventing the webbing from coming off of the webbing receivers, but also exhibit a function as surfaces that receive the load in the event of a side collision.

For this reason, the axial-direction stress generated in the webbing guides can be effectively lowered, and the load reaction force acting on the body from the webbing guides can be effectively lowered. As a result, an excellent effect is exhibited in that deformation of the webbing guides and the body can be effectively suppressed.

According to the seventh aspect of the invention, the structure can be simplified because the lower webbing guide is disposed coaxially with the center axis of inclination of the seat back. As a result, an excellent effect is exhibited in that the manufacture of the webbing guide mechanism can be facilitated.

According to the eighth aspect of the invention, one end portion of the webbing is locked in the webbing take-up device disposed on the vehicle body lower portion, the other end portion of the webbing is locked in the lower anchor member disposed on the vehicle body lower portion, and the intermediate portion of the webbing is supported such that it is insertable in the upper anchor member disposed on the vehicle body upper portion. Namely, the webbing is attached to the body. Thus, the degree of reinforcement of the vehicle seat in order to raise the webbing support strength thereof can be reduced in comparison to a mechanism where the webbing is attached to the seat. As a result, an excellent effect is exhibited in that the weight and manufacturing cost of the vehicular seat can be reduced.

BRIEF DESCRIPTION OF THE DRAWINGS

FIG. 12 is a side view corresponding to FIG. 11 showing an embodiment where another webbing guide has been added.

BEST MODE FOR IMPLEMENTING THE INVENTION

Figure 1:
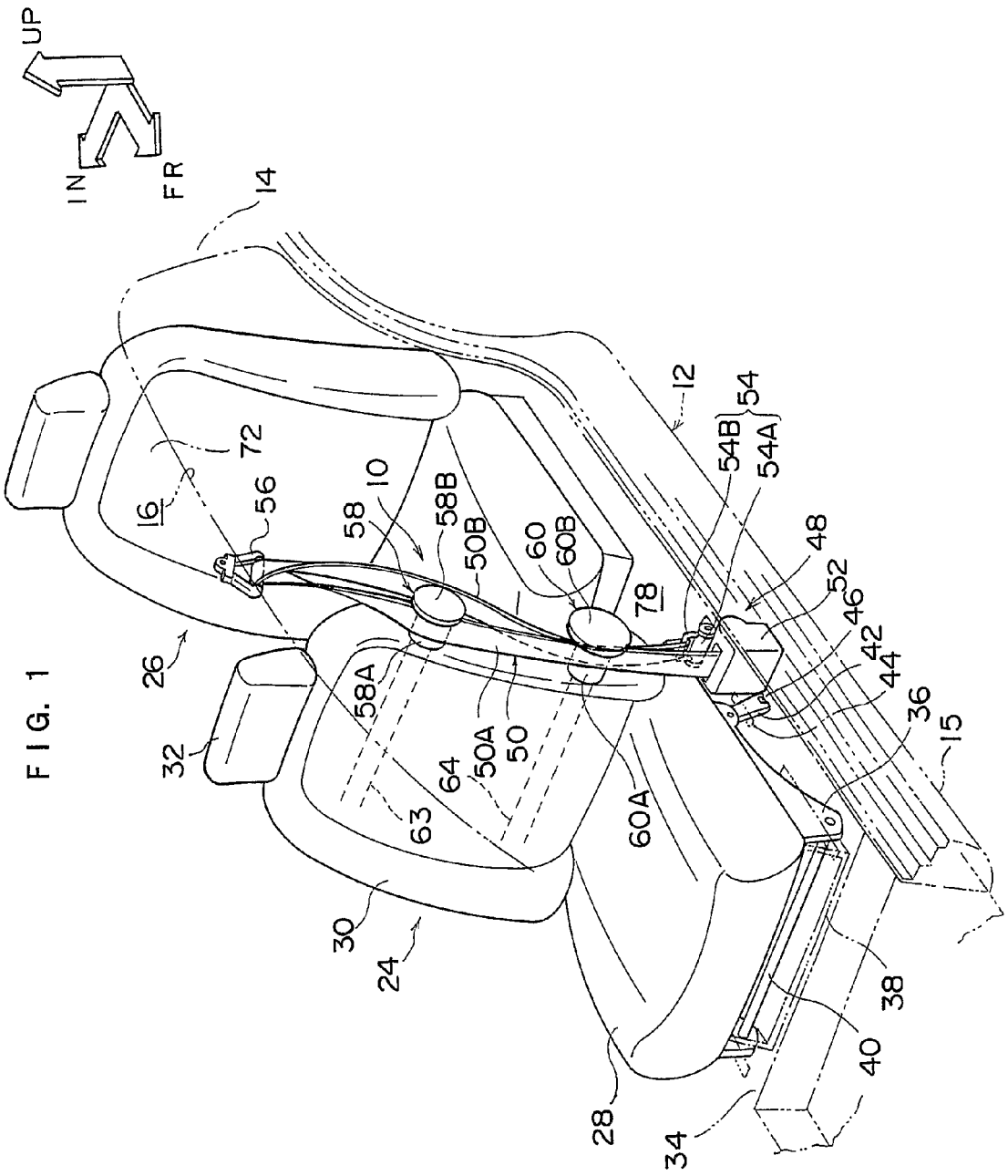
FIG. 1 is an overall perspective view showing a center pillar-less vehicle to which a webbing guide mechanism pertaining to an embodiment of the invention is applied.

An embodiment of a webbing guide mechanism pertaining to the invention will be described below using FIGS. 1 to 12. In the drawings, arrow FR represents the front side of a vehicle to which the webbing guide mechanism is applied, arrow UP represents the upper side of the vehicle, arrow IN represents the inner side of the vehicle in the vehicle width direction, and arrow OUT represents the outer side of the vehicle in the vehicle width direction.

Figure 5:
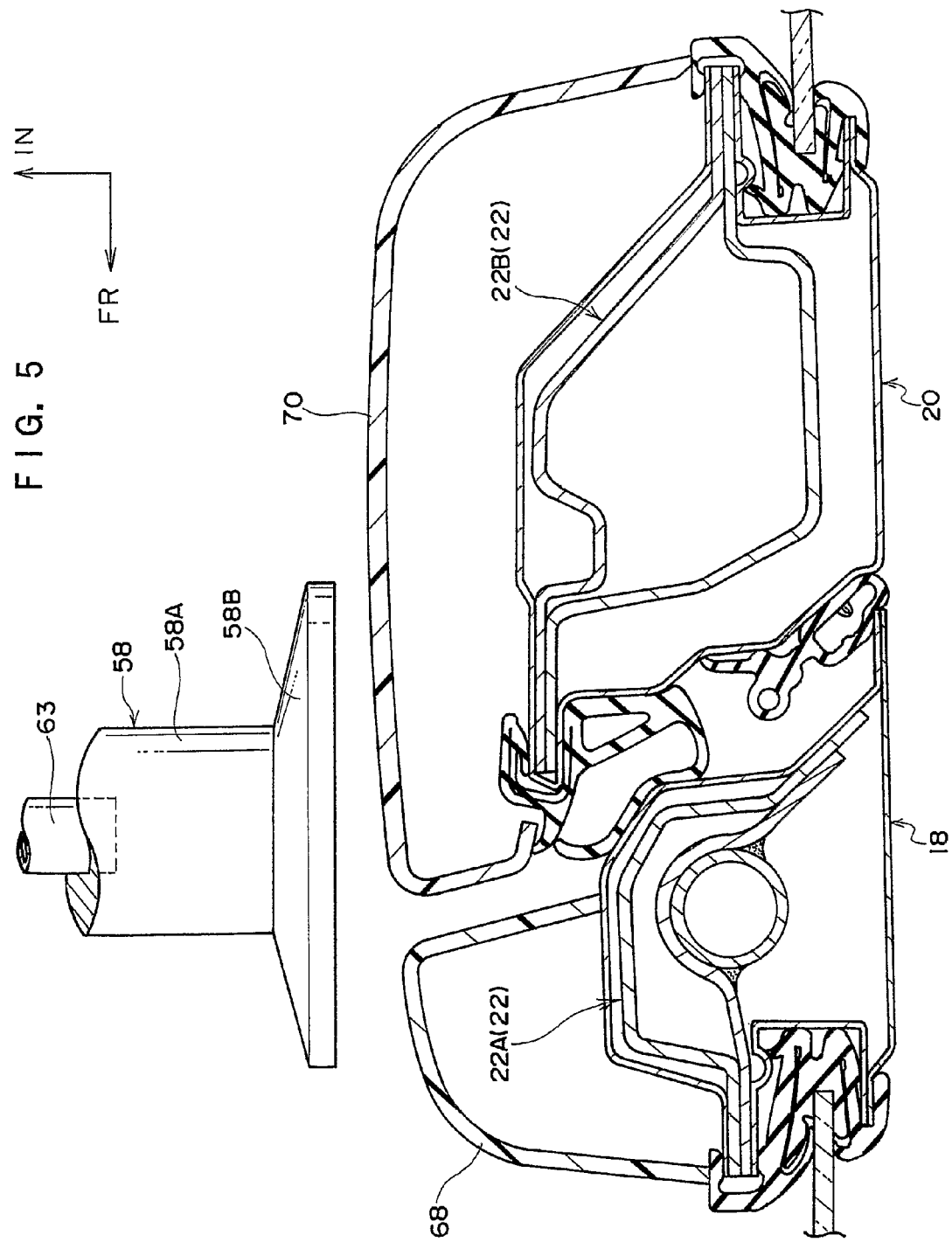
FIG. 5 is a horizontal cross-sectional view showing the configuration in the vicinity of a center pillar portion inside a door in a state where a front side door and a rear side door are closed.

FIG. 1 is an external perspective view showing the overall configuration of a webbing guide mechanism 10 pertaining to the invention. As shown in FIG. 1, a large open portion 16 is formed in a vehicle body side portion 12, from a front pillar to a rear pillar 14 and between a roof side 72 and a locker 15, such that a center pillar-less structure is adopted. As shown in FIG. 5, "center pillar-less structure" refers to a vehicle body structure where the center pillar attached to the body is done away with, and in place thereof a center pillar portion 22, which comprises a center pillar front portion 22A and a center pillar rear portion 22B that are divided longitudinally, is disposed at the rear end portion of a (swinging) front side door 18 and the front end portion of a (sliding) rear side door 20. Thus, an extremely broad open portion 16 is formed in the vehicle body side portion 12.

Returning to FIG. 1, a front seat 24 and a rear seat 26 serving as vehicular seats are disposed adjacent to the open portion 16. The front seat 24 is configured to include a seat cushion 28 in which a passenger sits, a seat back 30 that is inclinably supported on the rear end portion of the seat cushion 28, and a headrest 32 that is disposed, so as to be vertically adjustable and removable, on the upper end portion of the seat cushion 30 and supports the head of the passenger.

Figure 6:
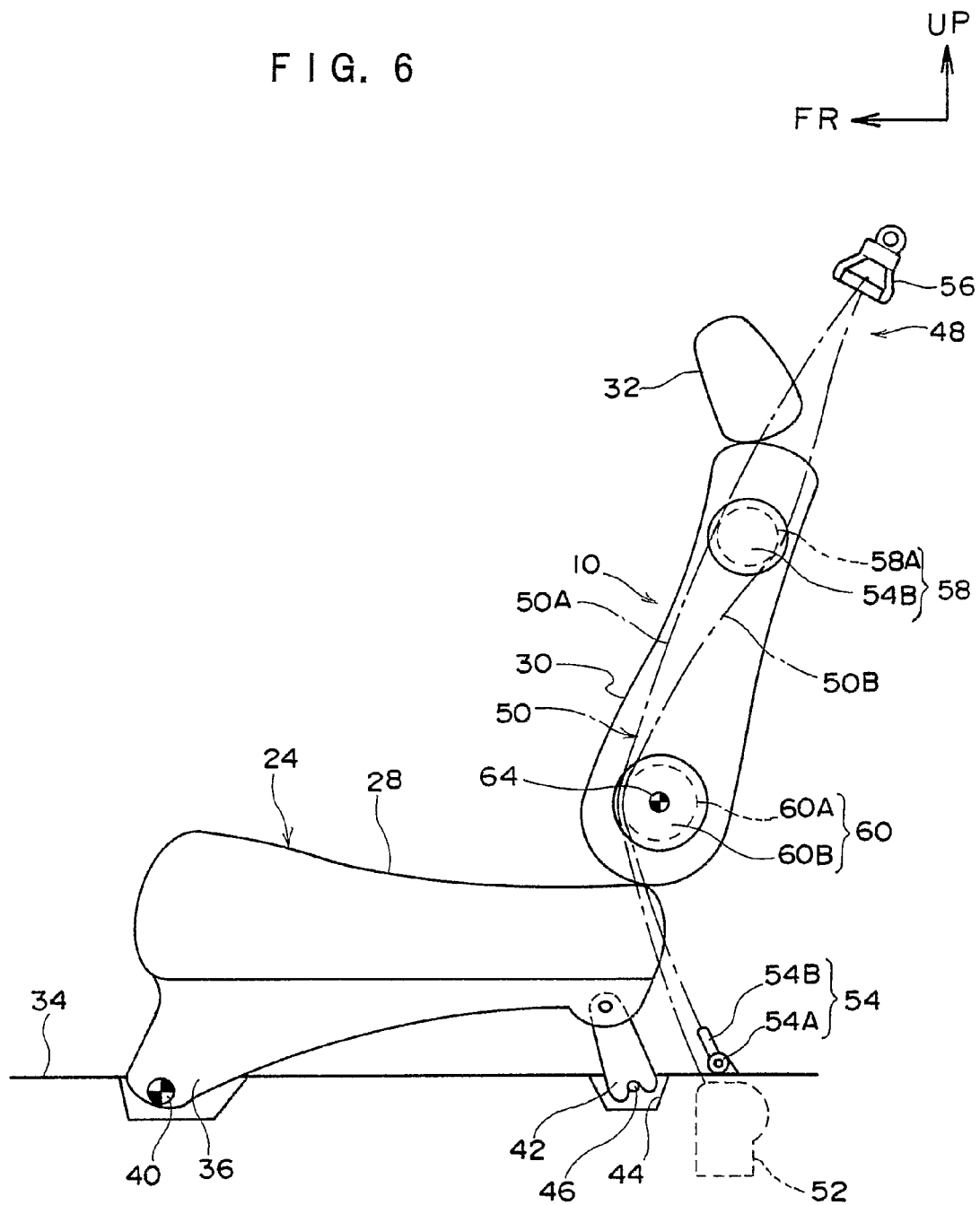
FIG. 6 is a side view showing a standard state of the front seat shown in FIG. 1.

With respect to the seat structure of the front seat 24, the state shown in FIGS. 1 and 6 is a standard state of the seat back 30, and therefore the front seat 24. By inclining the seat back 30 forward from this state, the seat back 30 can assume an inclined state where it becomes prostrate on, and substantially parallel to, the seat cushion 28.

The seat cushion 28 is supported on a vehicle body floor 34 at four places: two places at its front end portion and two places at its rear end portion. Specifically, the undersurface of the front end portion of the seat cushion 28 is disposed with a pair of left and right front leg portions 36 that protrude downward. The front leg portions 36 are formed such that they are long from front to back, and their front end portions are pivotably supported via a support shaft 40 on a support bracket 38 fixed to the vehicle body floor 34. The undersurface of the rear end portion of the seat cushion 28 is disposed with a pair of left and right rear leg portions 42 that protrude downward. The rear leg portions 42 are inserted into engagement holes 44 formed in the vehicle body floor 34 and engage with engagement pins 46; thus, the rear end portion of the seat cushion is disengageably supported with respect to the vehicle body floor 34. The rear leg portions 42 are axially supported on the rear end portions of the front leg portions 36 such that the rear leg portions 42 are pivotable around the base end portions.

Figure 9:
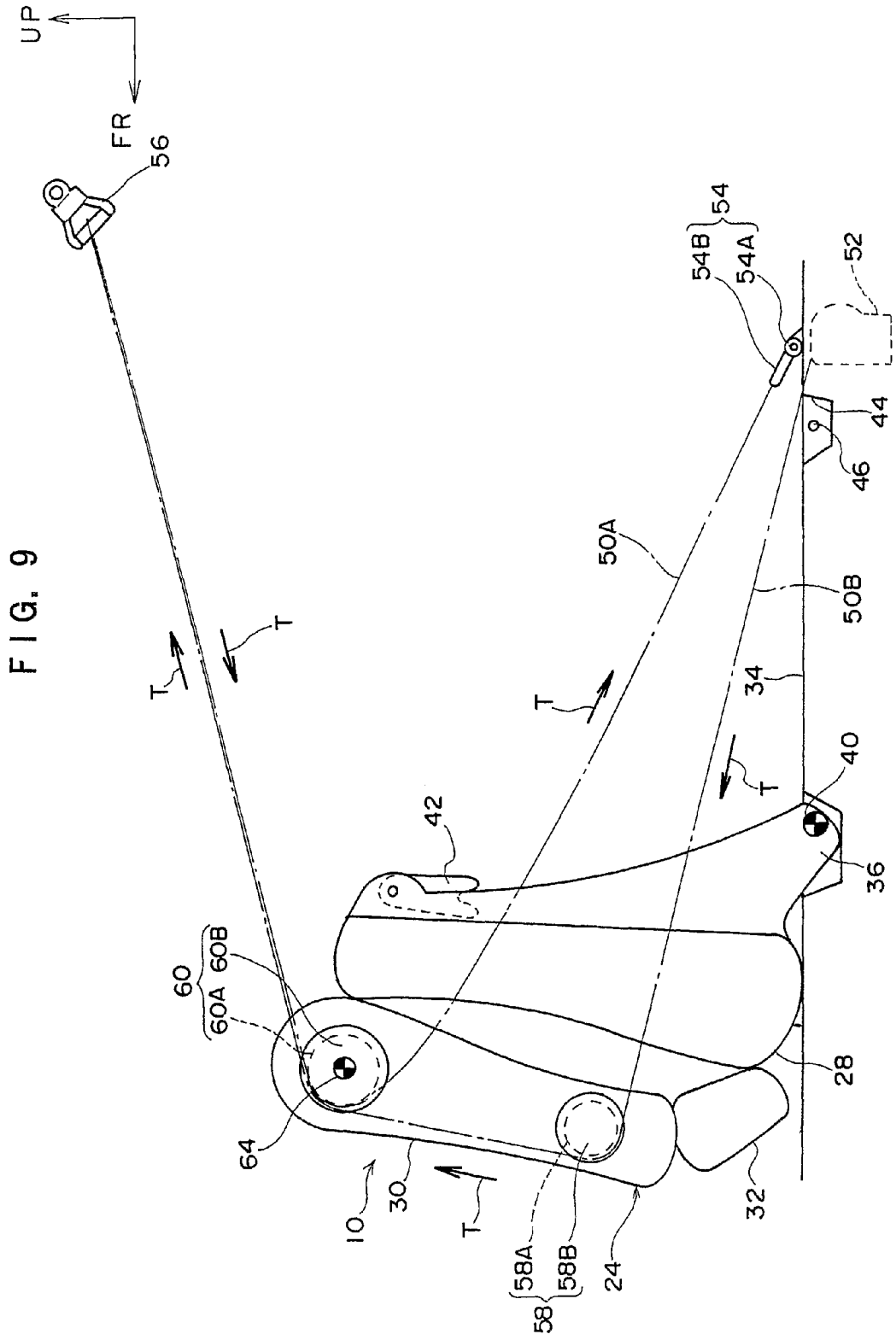
FIG. 9 is a side view showing a tumbled state of the front seat shown in FIG. 1.

As shown in FIG. 9, the rear leg portions 42 disengage from the engagement pins 46 in the vehicle body floor 34 as a result of operating an unillustrated operation lever disposed on the front seat 24, whereby the inclined front seat 24 can be pivoted 90 degrees forward around the support shaft 40 and inverted (tumbled state).

Thus, the front seat 24 of the present embodiment can assume three states to suit one's needs: the standard state, the inclined state, and the tumbled state.

The front seat 24 includes a seat belt device 48, which is a device for protecting the passenger. The seat belt device 48 includes a webbing 50 for restraining the passenger. One end portion of the webbing 50 is locked to a take-up shaft (not shown) of a webbing take-up device 52 disposed on the vehicle body floor 34. The other end portion of the webbing 50 is locked to an anchor member 54 disposed on the vehicle body floor 34. The anchor member 54 includes a cylindrically-shaped shaft portion 54A, which is rotatably axially supported on the vehicle body floor 34, and a lock portion 54B, which protrudes in a "U" shape from the shaft portion 54A toward the upper side of the vehicle and to which the other end portion of the webbing 50 is locked. The intermediate portion of the webbing 50 is inserted through a slip joint (shoulder anchor) 56 disposed in the vicinity of the roof side 72.

It is preferable to form the bottom edge portion of the slip joint 56 in a rotatable pipe shape in order to reduce sliding resistance between the bottom edge portion of the slip joint 56 and the intermediate portion of the webbing 50. In the present embodiment, the anchor member 54 has a rotatable configuration, but a conventional fixed anchor plate can also be used.

Although it is not illustrated, a tongue plate made of a highly strong member is inserted through the intermediate portion of the webbing 50 (the portion of the webbing 50 from the slip joint 56 to the webbing take-up device 52). An unillustrated buckle device is erectly disposed at the inner side of the front seat 24 in the width direction (near an unillustrated center console box). By inserting the tongue plate into the buckle device and causing the tongue plate to engage therewith, the passenger is restrained by the webbing 50 of the sheet belt device 48 with three supporting points, which comprises the shoulder webbing and the lap webbing.

Here, the webbing guide mechanism 10, which is the relevant portion of the present embodiment and disposed in a peripheral portion including the front seat 24, will be described in detail.

Figure 3:
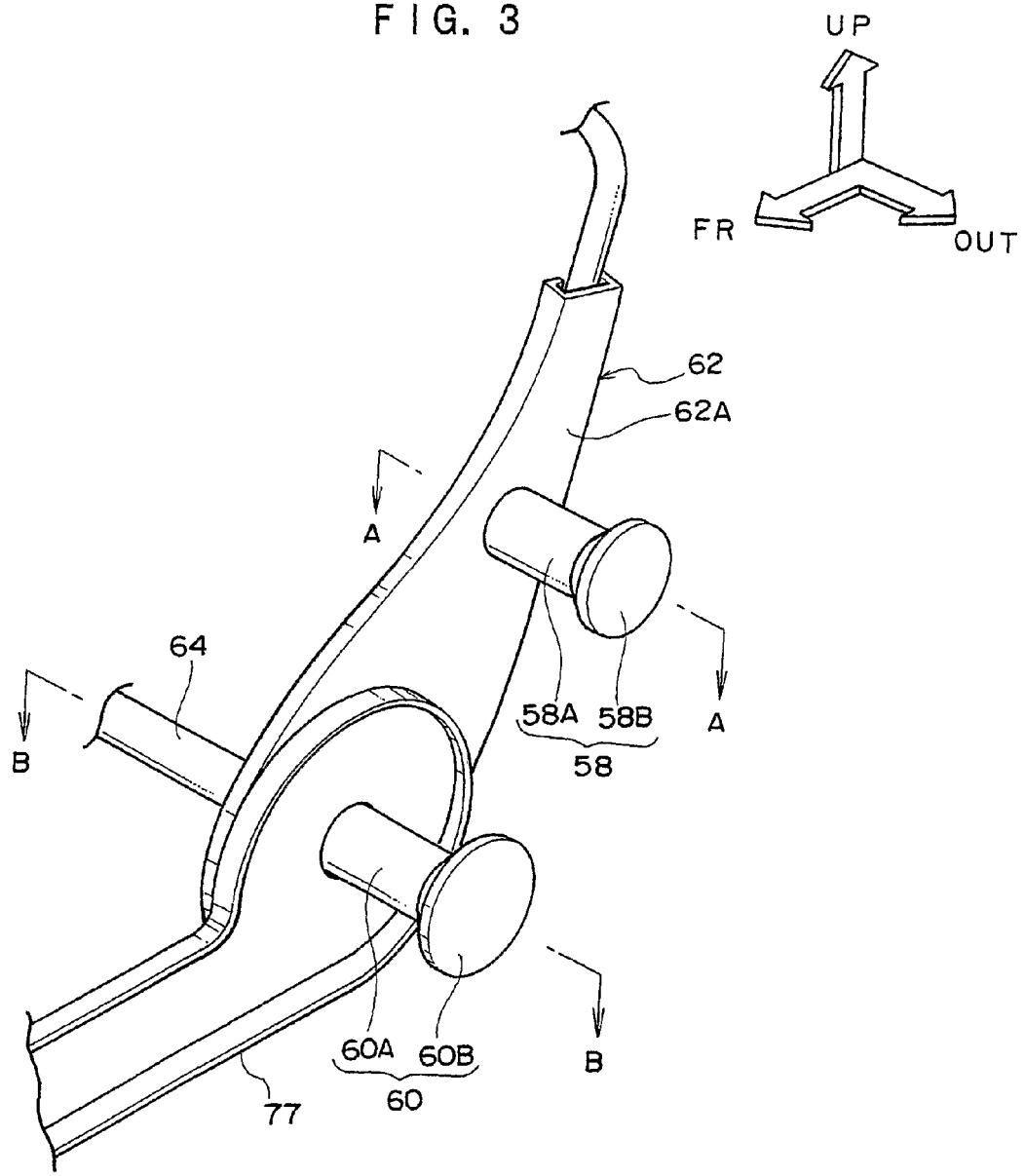
FIG. 3 is a partially enlarged perspective view showing a state where a frame member of the front seat and a guide roller shown in FIG. 1 are assembled.
Figure 4A:
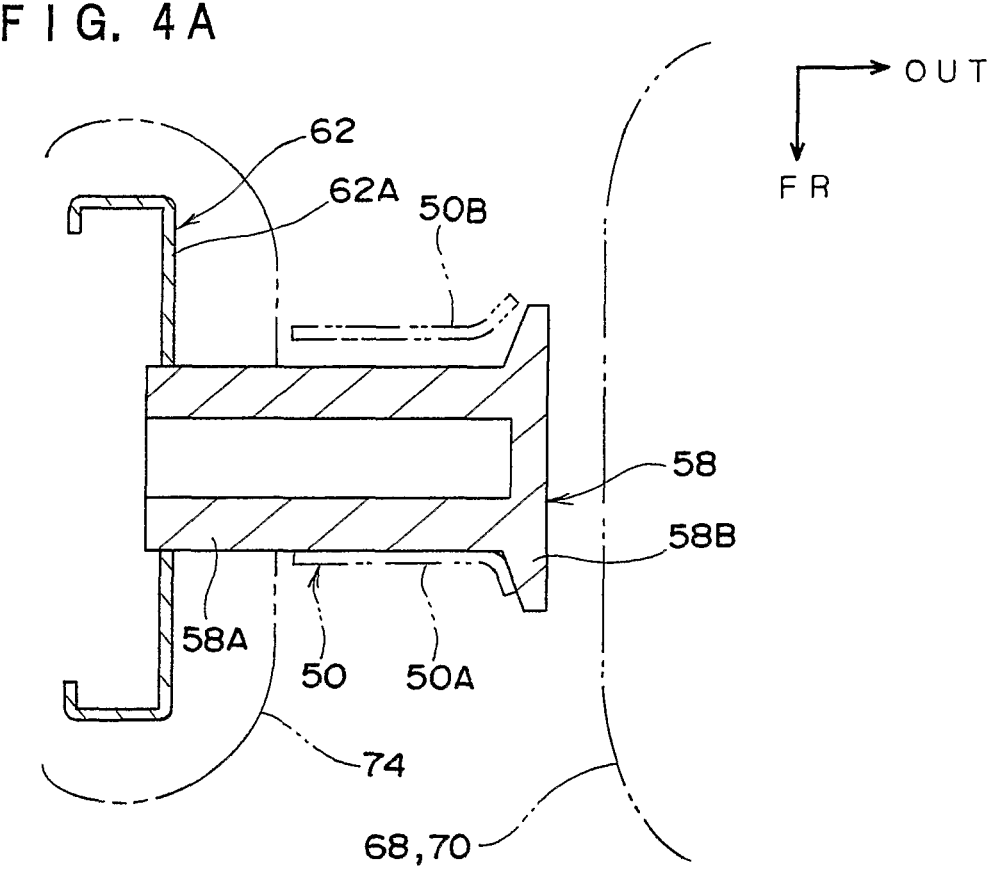
FIG. 4A is a cross-sectional view along line A-A of FIG. 3.

As shown in FIG. 1, the webbing guide mechanism 10 includes an upper webbing guide 58 and a lower webbing guide 60 that are disposed on the outer side portion of the seat back 30 of the front seat 24. Specifically, as shown in FIGS. 3 and 4A, the upper webbing guide 58 is configured by an upper guide portion 58A and a sword guard-like upper flange portion 58B. The upper guide portion 58A is formed in a substantially cylindrical shape and the base end portion thereof is fixed, by welding or using a screw, to a side portion 62A of a seat back frame 62 as a frame member. The upper flange portion 58B is formed integrally with the outer end portion of the upper guide portion 58A. The outer surface of the upper flange portion 58B is configured by a flat surface, but the inner surface of the upper flange portion 58B is formed as a tapered surface such that the webbing 50 moves toward the upper guide portion 58A when the webbing belt 50 slides.

FIGS. 3 and 4A show the upper guide portion 58A as if it is welded to the side portion 62A of the seat back frame 62, but the invention is not limited to this. For example, a configuration may also be used where the upper guide portion 58A is fixed, by welding or using a screw or a hinge, to the end portion of a reinforcement pipe 63 (see FIG. 1) serving as a seat frame member that spans the distance in the seat width direction between both side portions 62A of the seat back frame 62 and reinforces the seat back frame 62.

Figure 4B:
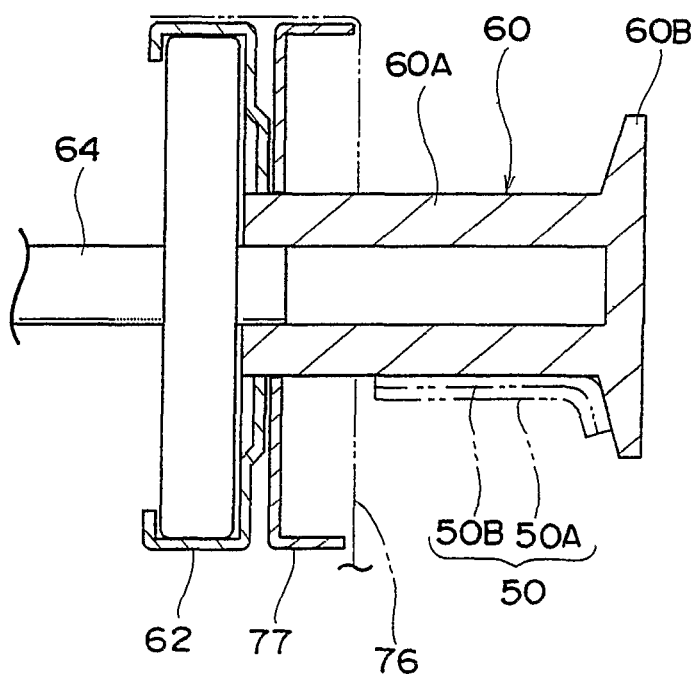
FIG. 4B is a cross-sectional view along line B-B of FIG. 3.

As shown in FIGS. 3 and 4B, the lower webbing guide 60 is basically configured in the same manner, and is configured by a lower guide portion 60A, which is formed in a substantially cylindrical shape, and a sword guard-like lower flange portion 60B, which is formed integrally with the outer end portion of the lower guide portion 60A. However, the base end portion of the lower guide portion 60A of the lower webbing guide 60 is fixed coaxially, by welding or using a screw or a hinge, to the end portion of a reinforcement pipe 64 serving as a seat frame member disposed in the lower end portion of the seat back 30 with the seat width direction serving as its axial direction. The position at which the reinforcement pipe 64 is disposed is the center of inclination when the seat back 30 is inclined. Similar to the upper flange portion 58B, the outer surface of the lower flange portion 60B is configured by a flat surface, but the inner surface of the lower flange portion 60B is formed as a tapered surface such that the webbing 50 moves toward the lower guide portion 60A when the webbing 50 slides.

The reinforcement pipes 63 and 64 are to be broadly understood as reinforcement members, which may include elongated members other than pipes, such as press-molded parts.

Figure 2:
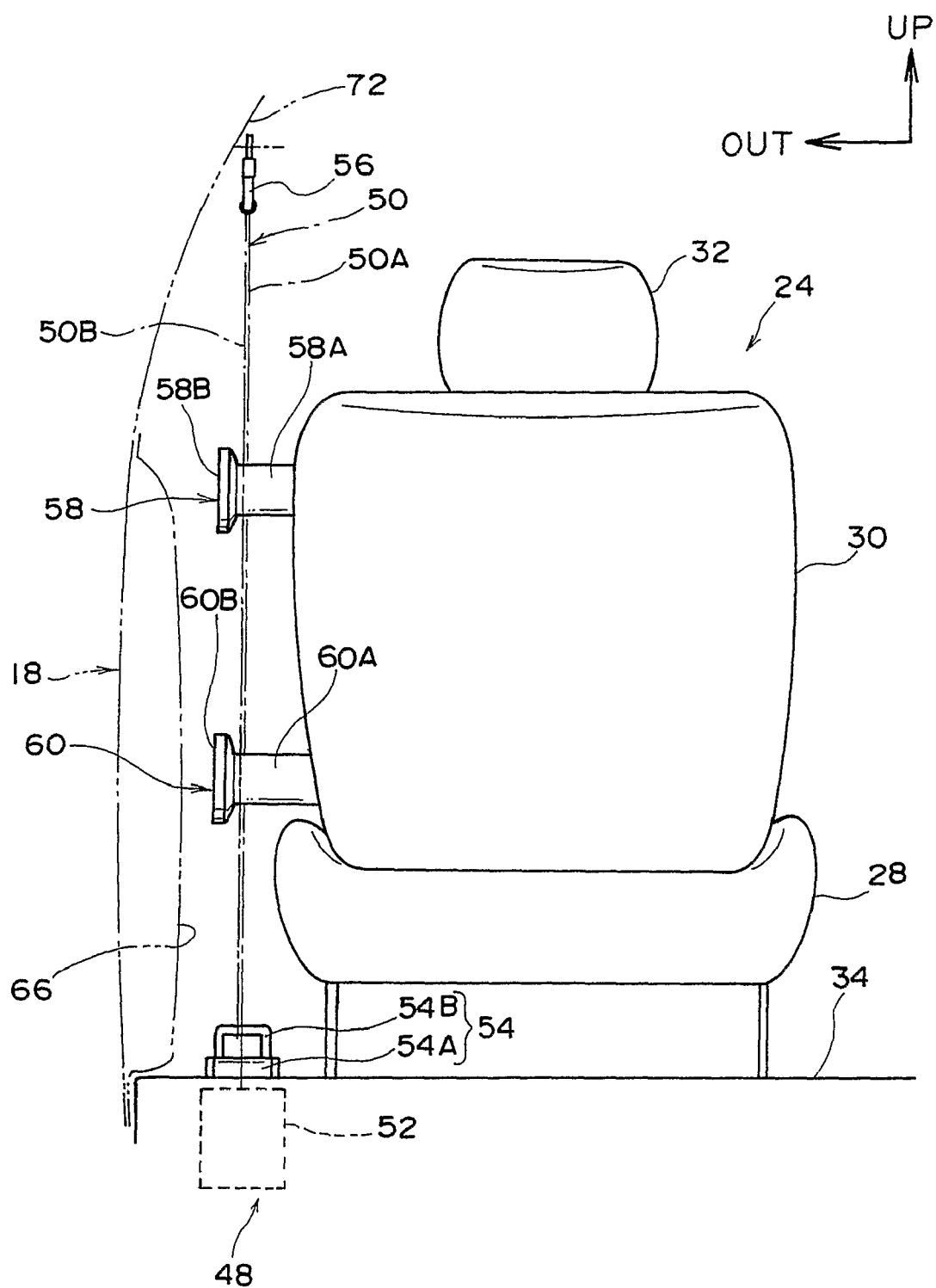
FIG. 2 is a rear view showing a front seat and the webbing guide mechanism shown in FIG. 1 seen from the rear side of the vehicle.

As shown in FIG. 2, the upper webbing guide 58 and the lower webbing guide 60 are disposed close to the door trim of the front side door 18, an interior garnish material 66 and interior materials of the rear side door 20, with a minimal space therebetween. In particular, as shown in FIGS. 4A and 5, the upper webbing guide 58 is disposed facing a door pillar garnish front portion 68 and a door pillar garnish rear portion 70 that cover the center pillar front portion 22A and the center pillar rear portion 22B.

The webbing 50 for restraining the passenger is routed in a looped manner on the upper webbing guide 58 and the lower webbing guide 60 from the vehicle body floor 34 to the roof side 72. Specifically, at the upper webbing guide 58, a front side 50A and a rear side 50B of the webbing 50 routed in the looped manner are correspondingly disposed on the front side and the rear side of the upper guide portion 58A at a site from the outer portion of a seat back pad 74 (see FIG. 4A) to the upper flange portion 58B.

At the lower webbing guide 60, both the front side 50A and the rear side 50B of the webbing 50 routed in the looped manner are disposed in a superposed manner on the front side of the lower guide portion 60A at a site from the outer portion of a design cover 76 (see FIG. 4B) to the lower flange portion 60B. The design cover 76 is disposed on the outer side of a seat cushion frame 77 (see FIG. 3).

Action and Effects of the Present Embodiment

Next, the action and effects of the present embodiment will be described.

Figure 10:
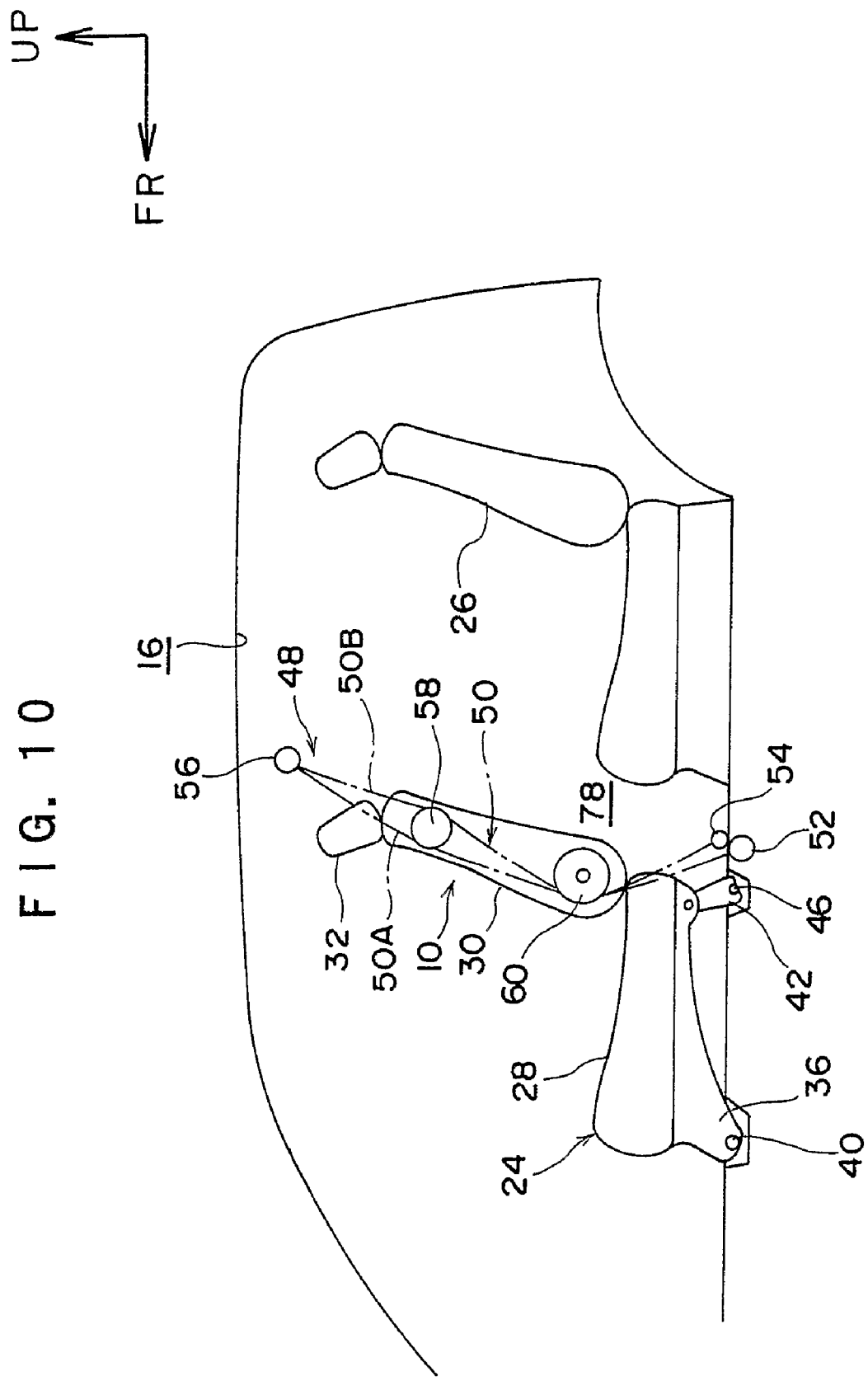
FIG. 10 is a side view showing a loading/unloading space between the front seat in the standard state and a rear seat.

The state shown in FIGS. 1, 2 and 6 is the standard state of the front seat 24. When the front seat 24 is in this state, the webbing 50 is routed along the routing path with respect to the webbing guide mechanism 10. Also, when the front seat 24 is in this state, a loading/unloading space 78 between the seat back 30 of the front seat 24 and the rear seat 26 is narrow, as shown in FIG. 10.

When the passenger climbs into or out of the rear seat 26, or when the passenger loads items into or unloads items from the rear seat 26, the front seat 24 is folded forward from the standard state by the following method.

Figure 7:
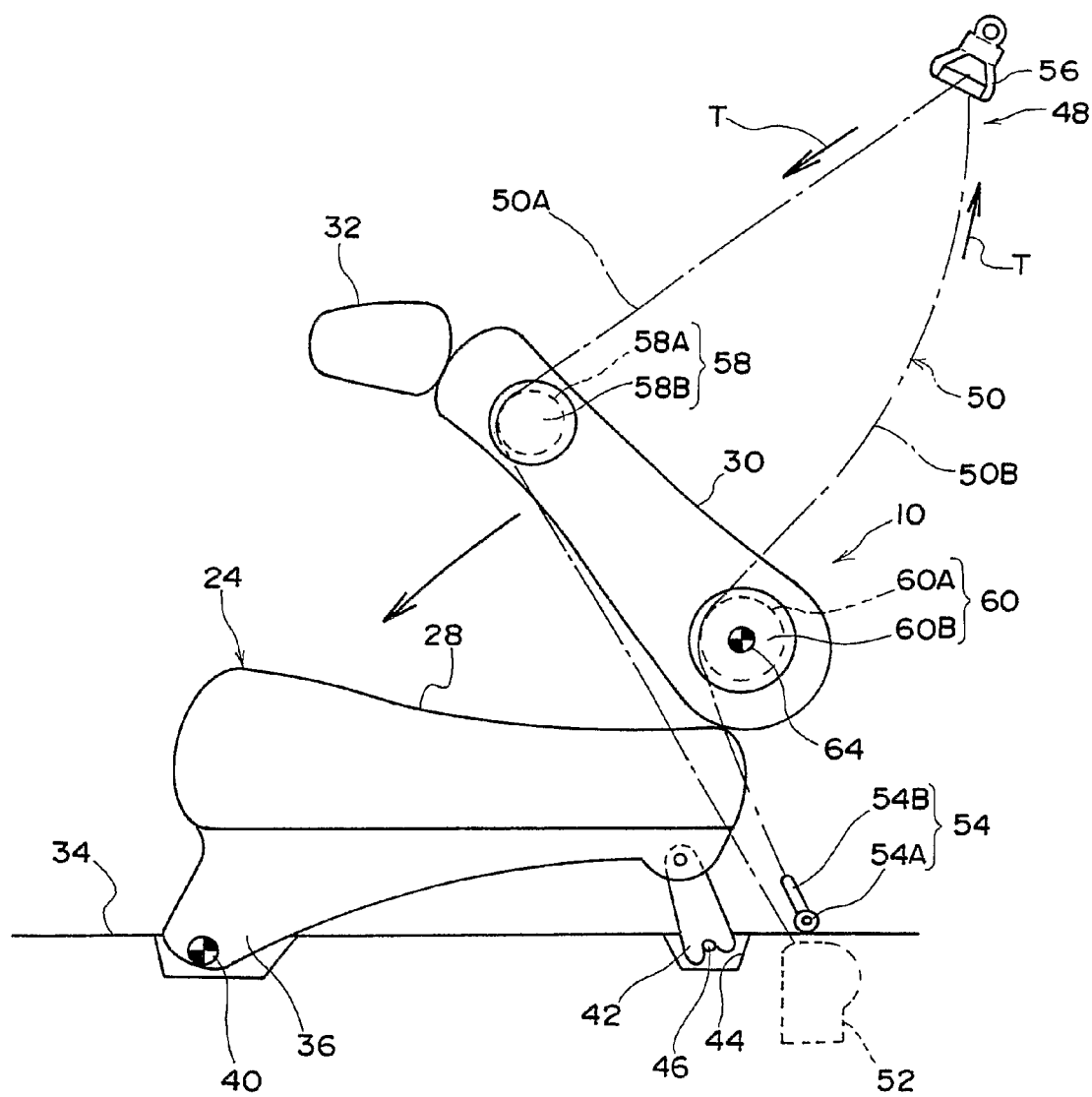
FIG. 7 is a side view showing a state where the front seat shown in FIG. 1 is being inclined forward.

First, as shown in FIG. 7, the passenger operates the unillustrated operation lever, whereby the seat back 30 inclines forward. The state shown in FIG. 7 is a state where the seat back 30 is being inclined. When the seat back 30 is in this state, the webbing 50 travels along the predetermined routing path with respect to the webbing guide mechanism 10, whereby the front side 50A of the webbing 50 is pulled forward (plane right angle direction with respect to the webbing 50) due to being pushed by the upper guide portion 58A of the upper webbing guide 58. However, the rear side 50B of the webbing 50 remains in the state where it is loosely wound on the lower guide portion 60A of the lower webbing guide 60. The arrow T shown adjacent to the webbing 50 in FIG. 7 represents the direction in which the tension acts.

Figure 8:
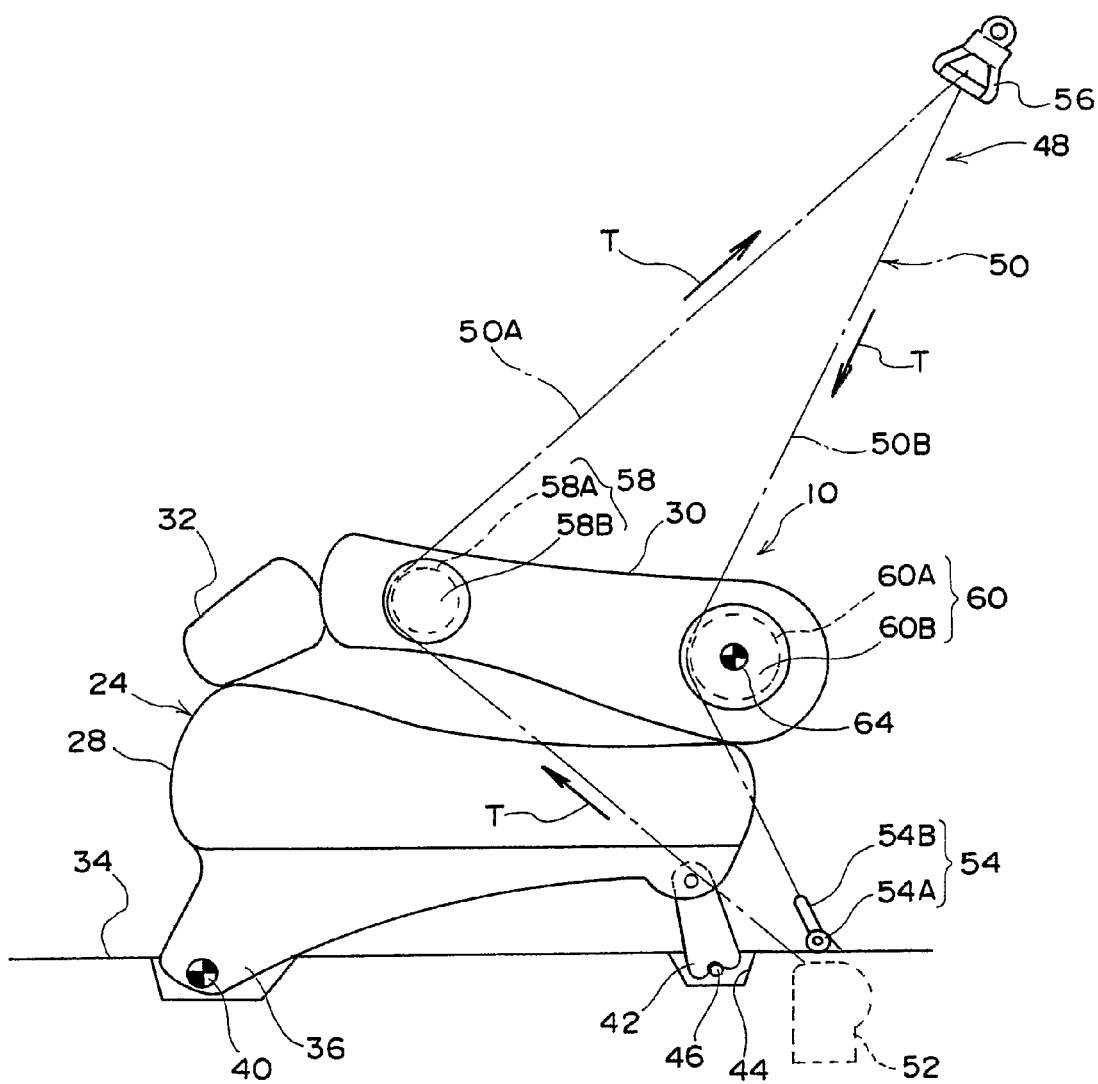
FIG. 8 is a side view showing an inclined state of the front seat shown in FIG. 1.

As shown in FIG. 8, when the seat back 30 is completely collapsed from this state and placed in the inclined or prostrate state, the upper webbing guide 58 is most displaced forward. When the seat back 30 is in this state, the webbing 50 is pulled to a certain extent by the upper webbing guide 58 counter to the urging force of the webbing take-up device 52. Thus, the direction in which the tension T acts on the closed loop of the webbing 50 is in the opposite direction of the direction shown in FIG. 7.

Figure 11:
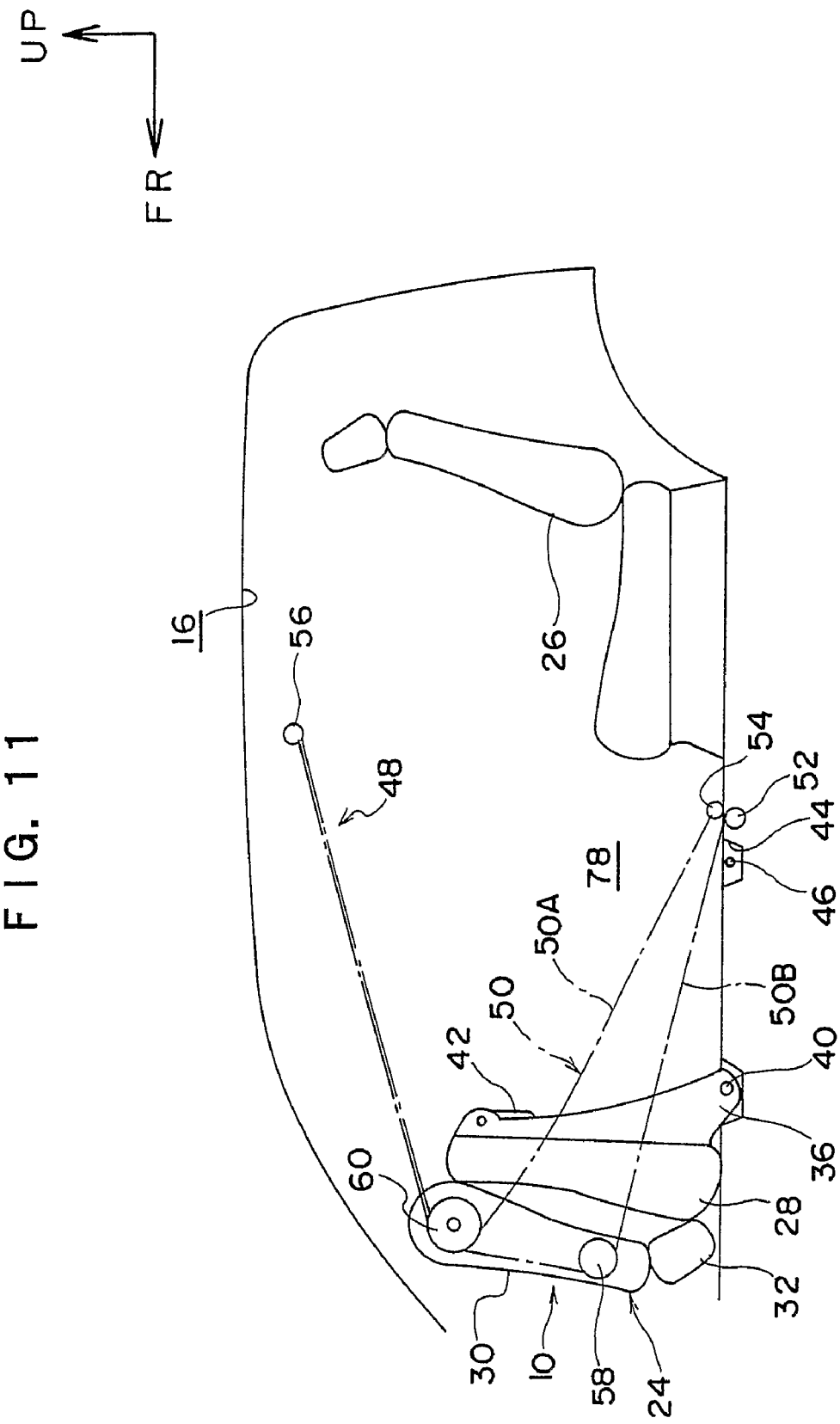
FIG. 11 is a side view showing the loading/unloading space between the front seat in the tumbled state and the rear seat.

As shown in FIG. 9, when the unillustrated operation lever is operated from this state, the rear leg portions 42 of the seat cushion 28 become unlocked from the vehicle body floor 34. Consequently, the entire inclined or prostrate front seat 24 can be rotated forward around the front leg portions 36 and inverted (i.e., tumbled). In this process, the front side 50A of the webbing 50 is pushed further forward by the upper webbing guide 58, and both the front side 50A and the rear side 50B of the webbing 50 are pushed forward and upward by the lower webbing guide 60 and greatly displaced. As a result, the loading/unloading space 78 between the seat back 30 of the front seat 24 and the rear seat 26 is enlarged, as shown in FIG. 11.

In this manner, in the webbing guide mechanism 10 pertaining to the present embodiment, the upper webbing guide 58 and the lower webbing guide 60 are disposed at upper and lower positions on the outer side portion of the seat back 30 of the front seat 24, and the webbing 50 of the seat belt device 48 attached to the body is wound and routed in a looped manner on the upper webbing guide 58 and the lower webbing guide 60. Thus, the routing path of the webbing 50 can be changed in accompaniment with the displacement of the seat back 30, and an extremely wide loading/unloading space 78 can be easily secured behind the front seat 24 by finally tumbling the front seat 24. Moreover, because the webbing 50 does not hang down in the loading/unloading space 78, the passenger can smoothly climb into or out of this space or load items into or unload item from this space.

In the webbing guide mechanism 10 pertaining to the present embodiment, a configuration is devised where the webbing 50 is routed in a looped manner on the upper webbing guide 58 and the lower webbing guide 60, and where the routing path of the webbing 50 is changed in conjunction with (in collaboration with) the movement (moving locus) of both of the webbing guides 58 and 60. Thus, in contrast with the prior art, winding the webbing again onto the webbing guides is not needed when the vehicular seat is returned to its original state, and the routing path of the webbing is automatically returned to its original state by conducting the operation of returning the front seat 24 to the standard state. Accordingly, the passenger is not troubled at all.

As described above, according to the webbing guide mechanism 10 pertaining to the present embodiment, the loading/unloading space 78 can be easily secured, without troubling the passenger, when the passenger climbs into or out of the loading/unloading space 78 or loads items into or unloads items from the loading/unloading space 78.

In the webbing guide mechanism 10 pertaining to the present embodiment, the front seat 24 is configured such that the front seat 24 can assume three states: the standard state where the seat back 30 is upright on the rear end portion of the seat cushion 28, the inclined state where the seat back 30 is prostrate on the seat cushion 28, and the tumbled state where the entire front seat 24 in the inclined state is integrally rotated forward around the front end portion of the seat cushion 28 and inverted.

For this reason, in the upper webbing guide 58, rotational displacement of about 90 degrees, from the upper side of the vehicle to the lower side of the vehicle, can be obtained and in the lower webbing guide 60, rotational displacement of about 90 degrees, from the lower side of the vehicle to the upper side of the vehicle, can be obtained. In other words, the displacement amounts are large and substantially the same in both the upper webbing guide 58 and the lower webbing guide 60, although the displacement directions are different between these two webbing guides.

Thus, it becomes easy to select the routing path of the webbing such that the degree of freedom in selecting the routing path of the webbing 50 becomes high and such that the loading/unloading space 78 becomes large. As a result, according to the present embodiment, a larger loading/unloading space 78 can be easily secured.

Moreover, in the webbing guide mechanism 10 pertaining to the present embodiment, the upper webbing guide 58 and the lower webbing guide 60 are respectively disposed with the upper guide portion 58A and the lower guide portion 60A that are formed in substantially cylindrical shapes with the seat width direction serving as the axial direction. Thus, the webbing 50 can be reliably retained on the peripheral surfaces of the upper webbing guide 58 and the lower webbing guide 60, and the routing path of the webbing 50 can be changed.

Also, the upper flange portion 58B and the lower flange portion 60B, which prevent the webbing 50 wound on the upper guide portion 58A and the lower guide portion 60A from coming off of the upper guide portion 58A and the lower guide portion 60B, are disposed on the outer end portions of the upper guide portion 58A of the upper webbing guide 58 and the lower guide portion 60A of the lower webbing guide 60. Thus, the webbing 50 does not come off of the upper guide portion 58A and the lower guide portion 60A even if the webbing 50 shifts toward the axial-direction outer side of the upper guide portion 58A and the lower guide portion 60A while the seat back 30 is being displaced. As a result, according to the present embodiment, reliability with respect to the operation of the webbing guide mechanism 10 can be raised.

Moreover, in the webbing guide mechanism 10 pertaining to the present embodiment, the upper webbing guide 58 and the lower webbing guide 60 are disposed at positions which overlap in side view with the reinforcement pipes 63 and 64 forming part of the frame member of the seat back 30. Thus, in the event of a side collision, the collision load inputted to the vehicle body from a side thereof can be transmitted to the reinforcement pipes 63 and 64 via the upper webbing guide 58 and the lower webbing guide 60 and dispersed in the seat back frame 62.

As a result, according to the present embodiment, the ability to protect the passenger in the event of a side collision can be improved.

Further, by setting the upper webbing guide 58 and the lower webbing guide 60 formed in substantially cylindrical shapes, on the outer side portion of the seat back 30, the upper webbing guide 58 and the lower webbing guide 60 function as spacers between the vehicle body and the seat back 30 in the event of a side collision. Thus, sandwiching of the webbing 50 between the body and the outer side portion of the seat back 30 can be alleviated or prevented.

In the webbing guide mechanism 10 pertaining to the present embodiment, the upper flange portion 58B and the lower flange portion 60B respectively disposed on the outer end portions of the upper guide portion 58A and the lower guide portion 60A are formed in discoid shapes with larger diameters than those of the upper guide portion 58A and the lower guide portion 60A. Thus, the collision load in the event of a side collision can be received by their broad surfaces. In other words, the upper flange portion 58B and the lower flange portion 60B not only fulfill the function of preventing the webbing 50 from coming off, but also exhibit a function as surfaces that receive the load in the event of a side collision.

For this reason, axial-direction stress generated in the upper webbing guide 58 and the lower webbing guide 60 can be effectively lowered, and the load reaction force applied on the vehicle body from the upper webbing guide 58 and the lower webbing guide 60 can be effectively lowered.

As a result, according to the present embodiment, deformation of the upper webbing guide 58, the lower webbing guide 60 and the vehicle body can be effectively suppressed.

Moreover, in the webbing guide mechanism 10 pertaining to the present embodiment, the configuration can be simplified because the lower webbing guide 60 is disposed coaxially with the reinforcement pipe 64 that is the center axis of inclination of the seat back 30. Thus, the manufacture of the webbing guide mechanism 10 can be facilitated.

In the webbing guide mechanism 10 pertaining to the present embodiment, the end portions of the webbing 50 are locked in the webbing take-up device 52 and the anchor member 54 disposed on the vehicle body floor 34, and the intermediate portion of the webbing 50 is supported such that it is insertable through the slip joint 56 disposed in the vicinity of the roof side 72. Namely, the webbing 50 is attached to the body. Thus, the degree of reinforcement of the front seat 24 in order to raise the webbing support strength of the front seat 24 can be reduced in comparison to a mechanism where the webbing 50 is attached to the seat. As a result, according to the present embodiment, the weight and manufacturing cost of the front seat 24 can be reduced.

Supplemental Description of the Embodiment

In the preceding embodiment, the webbing guide mechanism pertaining to the invention was applied to a center pillar-less vehicle, but the invention is not limited thereto. The invention may also be applied to a two-door vehicle disposed with a walk-in mechanism.

In the preceding embodiment, the seat back 30 was configured to be inclinable with respect to the seat cushion 28, but the "vehicular seat" in the invention also includes vehicular seats whose seat backs are integrated with the cushion and which do not incline. Such vehicular seats may be disposed as auxiliary seats.

In the preceding embodiment, the webbing guide mechanism pertaining to the invention is applied to the front seat 24 whose principal "displacement" is "rotation" including folding. However, the "displacement" in the invention includes not only rotation but linear motion such as sliding in the longitudinal direction of the vehicle.

In the webbing guide mechanism 10 pertaining to the embodiment described above, the front side 50A of the webbing 50 is pushed forward by the upper webbing guide 58 while the seat back 30 is being inclined from the standard state, but the lower webbing guide 60 does not specially act on the webbing 50 at this stage. When the front seat 24 is displaced from the inclined state to the tumbled state, the upper webbing guide 58 and the lower webbing guide 60 both rotate and are displaced to change the routing path of the webbing 50.

The expression "the webbing guides work together" or "the webbing guides work collaboratively" in the first aspect of the invention includes cases where, in a certain aspect, only one of the webbing guides acts to change the routing path of the webbing, but in another aspect, all of the webbing guides contribute to changing the routing path of the webbing.

Moreover, in the webbing guide mechanism 10 pertaining to the preceding embodiment, a configuration is used where the upper webbing guide 58 and the lower webbing guide 60 are respectively disposed on the upper portion and the lower portion of the outer side face of the seat back 30. However, the invention is not limited thereto. The invention may also have a configuration where webbing guides are disposed on the side portion of the seat back 30 at plural places in the height direction. For example, as shown in FIG. 12, another webbing guide 80 may be disposed between the upper webbing guide 58 and the lower webbing guide 60, so that the loading/unloading space 78 is enlarged even more than the case shown in FIG. 11.

In the preceding embodiment, the webbing guide mechanism pertaining to the invention is applied to the front seat 24 capable of assuming three states comprising the standard state, the inclined state, and the tumbled state, but the invention is not limited thereto. The invention may also be applied to a vehicular seat including aspects other than these three states.

Moreover, in the webbing guide mechanism 10 pertaining to the embodiment described above, a mechanism is used where the upper guide mechanism 58 and the lower guide mechanism 60 are fixedly disposed with respect to the seat back frame 62, but the invention is not limited thereto. For example, a roller-like webbing guide that is rotatable around a support shaft may be used, so that the effect of reducing sliding resistance between the webbing guide and the webbing 50 is obtained.

In the webbing guide mechanism 10 pertaining to the embodiment described above, the discoid upper flange portion 58B and the lower flange portion 60B are disposed as means for preventing the webbing 50 from coming off, but the invention is not limited thereto. For example, triangular protrusions that protrude outward in the radial direction may be formed in the circumferential direction on the outer end portions of the upper guide portion 58A and the lower guide portion 60A, in about four places at 90-degree intervals therebetween.

The invention claimed is:

1. A webbing guide mechanism that is disposed on a seat rear portion of a vehicular seat and configured to include webbing guides that regulate a routing path of a webbing that is supported on a vehicle body and is for restraining a passenger, wherein the webbing guides are disposed on the seat rear portion at plural places in a seat height direction, the webbing is routed in a looped manner from a vehicle body lower portion side to a vehicle body upper portion side, a front side and a rear side of the webbing routed in the looped manner are correspondingly disposed on a front side and a rear side of a webbing guide positioned at an upper side of the seat rear portion in the seat height direction, and both of the front side and the rear side of the webbing routed in the looped manner are disposed on a front side of a webbing guide positioned at a lower side of the seat rear portion in the seat height direction.

2. The webbing guide mechanism of claim 1, wherein
the vehicular seat is configured to include a seat cushion in which the passenger sits and a seat back that is inclinably disposed on a rear end portion of the seat cushion and configures the seat rear portion, and
the vehicular seat is configured to assume at least three states comprising a standard state where the seat back is upright on the rear end portion of the seat cushion, an inclined state where the seat back is prostrate on the seat cushion, and a tumbled state where the inclined vehicular seat is integrally rotated forward and becomes inverted with a front end portion of the seat cushion serving as a support point.

3. The webbing guide mechanism of claim 2, wherein the webbing guides are disposed such that the webbing does not interfere with a rear-side loading/unloading space when the seat back is in the tumbled state.

4. The webbing guide mechanism of claim 1, wherein the webbing guides comprise an upper webbing guide disposed on an upper portion of an outer side face of the seat rear portion in a seat width direction and a lower webbing guide disposed on a lower portion of the outer side face of the seat rear portion in the seat width direction, and
each of the upper webbing guide and the lower webbing guide is configured to include a webbing receiver formed in a substantially cylindrical shape whose axial direction is in the seat width direction and coming-off prevention means that is disposed on an outer end portion of the webbing receiver and prevents the webbing wound onto the webbing receiver from coming off of the webbing receiver.

5. The webbing guide mechanism of claim 4, wherein the coming-off prevention means is a flange portion that planarly spreads in a direction perpendicular to an axis of the webbing receiver.

6. The webbing guide mechanism of claim 4, wherein the lower webbing guide is disposed coaxially with a center axis of inclination of the seat back.

7. The webbing guide mechanism of claim 4, wherein another webbing guide is disposed between the upper webbing guide and the lower webbing guide on the outer side face, in the seat width direction, of the seat rear portion.

8. The webbing guide mechanism of claim 1, further comprising:
seat frame members disposed along a seat width direction, wherein the webbing guides are disposed on an outer side face, in the seat width direction, of the seat rear portion and at positions corresponding to, when seen in side view, the seat frame members.

9. The webbing guide mechanism of claim 1, wherein one end portion of the webbing is locked in a webbing take-up device disposed on the vehicle body lower portion side, the other end portion of the webbing is locked in a lower anchor member disposed on the vehicle body lower portion side, and the intermediate portion of the webbing is supported such that it is insertable in an upper anchor member disposed on the vehicle body upper portion side.

10. The webbing guide mechanism of claim 1, further comprising:
a seat back frame,
wherein the webbing guides are fixedly disposed with respect to the seat back frame.

11. The webbing guide mechanism of claim 1, further comprising:
a seat back frame,
wherein the webbing guides move with the seat back frame when the seat back frame moves.

12. The webbing guide mechanism of claim 1, wherein the webbing guides work together in accompaniment with a displacement of the seat rear portion to change the routing path of the webbing.

13. A webbing guide mechanism that is disposed on a seat rear portion of a vehicular seat and regulates a routing path of a webbing that is supported on a vehicle body and is for restraining a passenger, the webbing guide mechanism comprising:
an upper webbing guide disposed on an upper portion of an outer side face of the seat rear portion in a seat width direction; and
a lower webbing guide disposed on a lower portion of the outer side face of the seat rear portion in the seat width direction, wherein
the webbing is routed in a looped manner from a vehicle body lower portion side to a vehicle body upper portion side,
a front side and a rear side of the webbing routed in the looped manner are correspondingly disposed on a front side and a rear side of the upper webbing guide,
both of the front side and the rear side of the webbing routed in the looped manner are disposed on a front side of the lower webbing guide,
the vehicular seat is configured to include a seat cushion in which the passenger sits and a seat back that is inclinably disposed on a rear end portion of the seat cushion and configures the seat rear portion, and
the lower webbing guide is disposed coaxially with a center axis of inclination of the seat back.

14. The webbing guide mechanism of claim 13, wherein the upper webbing guide and the lower webbing guide are configured to work together to change the routing path of the webbing in accompaniment with a displacement of the seat rear portion.

15. The webbing guide mechanism of claim 13, wherein another webbing guide is disposed between the upper webbing guide and the lower webbing guide on the outer side face of the seat rear portion in the seat width direction.

16. The webbing guide mechanism of claim 13, wherein the vehicular seat is configured to assume at least three states comprising a standard state where the seat back is upright on the rear end portion of the seat cushion, an inclined state where the seat back is prostrate on the seat cushion, and a tumbled state where the inclined vehicular seat is integrally rotated forward and becomes inverted with a front end portion of the seat cushion serving as a support point.

17. The webbing guide mechanism of claim 16, wherein the upper webbing guide and the lower webbing guide are disposed such that the webbing does not interfere with a rear-side loading/unloading space when the seat back is in the tumbled state.

18. The webbing guide mechanism of claim 13, wherein each of the upper webbing guide and the lower webbing guide is configured to include a webbing receiver formed in a substantially cylindrical shape whose axial direction is in the seat width direction and coming-off prevention means that is disposed on an outer end portion of the webbing receiver and prevents the webbing wound on the webbing receiver from coming off of the webbing receiver.

19. The webbing guide mechanism of claim 18, wherein the coming-off prevention means is a flange portion that planarly spreads in a direction perpendicular to an axis of the webbing receiver.

20. The webbing guide mechanism of claim 13, further comprising:

seat frame members disposed along the seat width direction, wherein the webbing guides are disposed on the outer side face, in the seat width direction, of the seat rear portion and at positions corresponding to, when seen in side view, the seat frame members.

* * * * *